Sept. 15, 1970

W. S. EVERETT 3,528,226

HORIZONTAL VAPOR-LIQUID SEPARATOR

Filed Oct. 18, 1968

INVENTOR.
WILHELM S. EVERETT
BY *Elliott & Pastoriza*
ATTORNEYS.

Sept. 15, 1970     W. S. EVERETT     3,528,226
HORIZONTAL VAPOR-LIQUID SEPARATOR
Filed Oct. 18, 1968     2 Sheets-Sheet 2
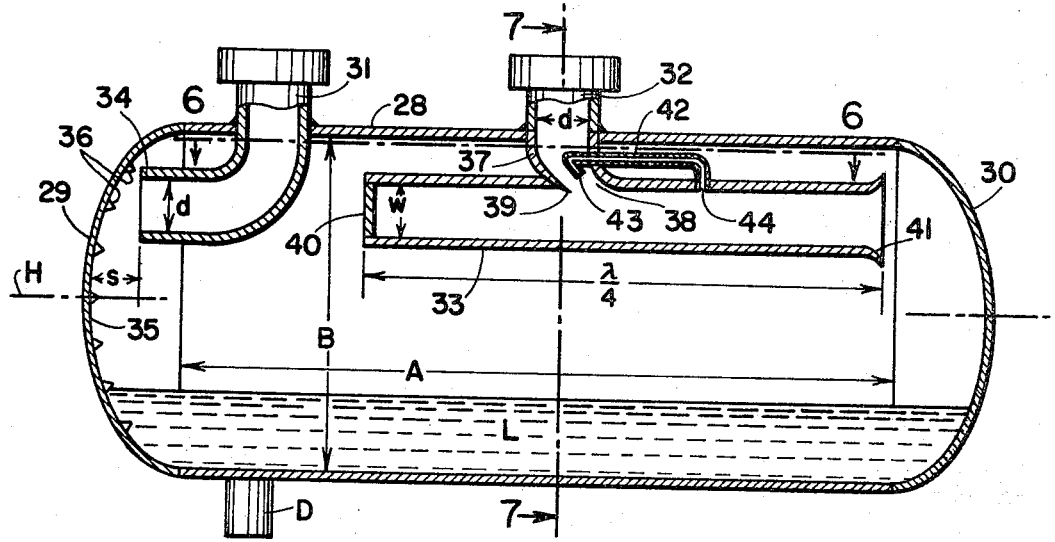
FIG. 5
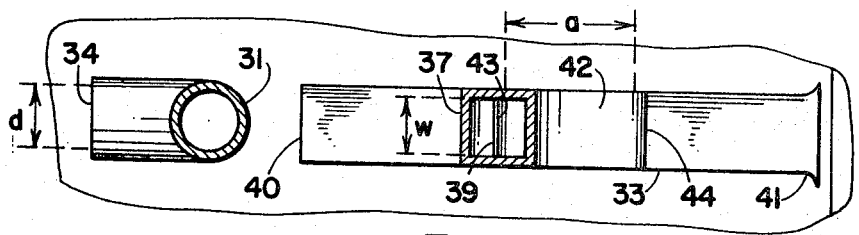
FIG. 6
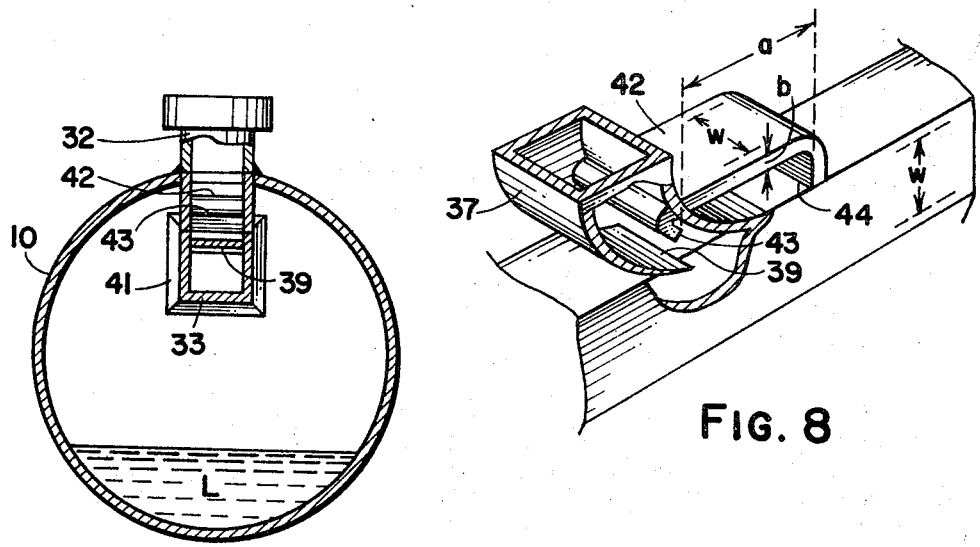
FIG. 7
FIG. 8
INVENTOR.
WILHELM S. EVERETT
BY *Elliott & Pastoriza*
ATTORNEYS

United States Patent Office 3,528,226
Patented Sept. 15, 1970

3,528,226
HORIZONTAL VAPOR-LIQUID SEPARATOR
Wilhelm S. Everett, 126 W. Santa Barbara St.,
Santa Paula, Calif. 93060
Continuation-in-part of application Ser. No. 492,243,
Oct. 1, 1965. This application Oct. 18, 1968, Ser.
No. 772,449
Int. Cl. B01d 51/08
U.S. Cl. 55—277        4 Claims

ABSTRACT OF THE DISCLOSURE

An elongated horizontally disposed vessel is provided with inlet and outlet openings through which a fluid mixture passes. The vessel includes at least one acoustically resonant chamber or organ pipe having a flow diverting obstruction proximate to the inlet and/or outlet openings such that the fluid passing the obstruction will cause reverberations in the chamber to generate infrasonic noise to effect separation of vapor and liquid comprising the fluid mixture.

---

This application is a continuation-in-part of my copending application Ser. No. 492,243 filed Oct. 1, 1965, and now abandoned entitled Horizontal Vapor-Liquid Separator.

This invention generally relates to separators for separating out liquids or particles entrained in vapors or gases as the fluid mixture passes through a drum or vessel. For purposes of this application, the present invention will be illustratively described in its relationship to a horizontal type of vapor-liquid separator in which the device is designed to be applied in a manner to employ gravity as a means of causing the liquid droplets to settle into the lower portion of the drum or vessel.

It is to be understood, however, that throughout the specification and claims hereof, the entrained liquid may also be particulate matter and the vapor may be gas. Thus, these terms are only meant to relate to a particular use of the device without limitation.

BACKGROUND OF THE INVENTION

Horizontal vapor-liquid separators have been known in the art and have been used in various chemical processes and particularly in the oil refining industries. Generally, however, such vapor-liquid separators either use some type of resistance in the flow path of the vapor-liquid mixture which tends to agglomerate droplets of the liquid, such as wire mesh pads or the like; or such separators embody centrifugal devices which create cyclones so that the heavier liquid droplets are separated out as a result of their heavier mass.

Although some theoretical considerations have been given to the use of noise generation as a means of vapor-liquid separation, no satisfactory structural approaches have, to my knowledge, been suggested or taught by the prior art.

OBJECTS OF THE PRESENT INVENTION

An object, therefore, of the present invention is to provide a horizontal vapor-liquid separator which embodies therein an infra-sonic generator for the purpose of assisting in the formation of and the agglomeration of the liquid droplets being separated out.

Another object of the present invention is to provide a horizontal vapor-liquid separator which may be economically constructed without any moving parts such that it will have an extended life without any appreciable maintenance.

Still another object of the present invention is to provide a horizontal vapor-liquid separator embodying noise generating means in which the flow of the vapor-liquid is not substantially impeded by the noise generating structure and yet in which the noise generating structure assists materially in the agglomeration of the liquid particles.

Still a further object of the present invention is to provide a horizontal vapor-liquid separator in which the infra-sonic generating means may be precisely tuned and designed to be properly in phase with the particular characteristics of the vapor-liquid so as to achieve maximum separation.

BRIEF DESCRIPTION OF THE INVENTION

The foregoing and other objects and advantages of the present invention are generally achieved by providing a horizontal vapor-liquid separator comprising an elongated closed vessel or drum designed to be mounted with its longitudinal dimension in a horizontal plane. The vessel has an inlet fluid opening and an outlet fluid opening with an inlet line sealably communicating with the inlet opening and an outlet line sealably communicating with the outlet opening.

A noise generating chamber such as an organ pipe is disposed in the vessel in such a manner that the chamber has a mouth opening proximate the inlet or outlet opening to the vessel. Means are associated with the inlet or outlet opening for directing fluid flowing therethrough past the mouth of the chamber to thereby generate noise at infra-sonic frequencies to assist in separating out the entrained liquid particles and/or the formation of droplets as the vapor-liquid fluid flows through said inlet opening and thereafter through the vessel to the outlet opening thereof.

In a preferred embodiment, a quarter wave length horizontally disposed organ pipe having one end closed is utilized as the noise generating chamber, the outlet opening of the vessel having an outlet line intercepting a wall of the organ pipe intermediate its ends. The intersection of the outlet with the wall defines an obstruction dividing flow entering the opening end of the pipe and passing down the pipe such that a first part of the flow initially passes out the outlet line and a second part continues down the organ pipe towards the closed end before ultimately returning and passing through the outlet line. A small sensing line is positioned in the outlet line with one open end adjacent to the obstruction facing the flow passing through the outlet line. The other end of the sensing line connects to the organ pipe at a point intermediate its open end and the intersection point of the outlet line. With this arrangement and proper dimensioning of the component parts, very efficient separation is achieved as a result of the infra-sonic noise energy generated by the organ pipe and sensing line combination.

BRIEF DESCRIPTION OF THE DRAWINGS

A better understanding of the invention will be had by reference to the drawings, showing various embodiments, in which:

FIG. 5 is a sectional view of a preferred embodiment of the invention;

FIG. 6 is a fragmentary plan view, partly in section, taken in the direction of the arrows 6—6 of FIG. 5;

FIG. 7 is a cross section taken in the direction of the arrows 7—7 of FIG. 5; and, FIG. 8 is a fragmentary perspective view of a portion of the embodiment of FIGS. 5 to 7.

Figure 1:
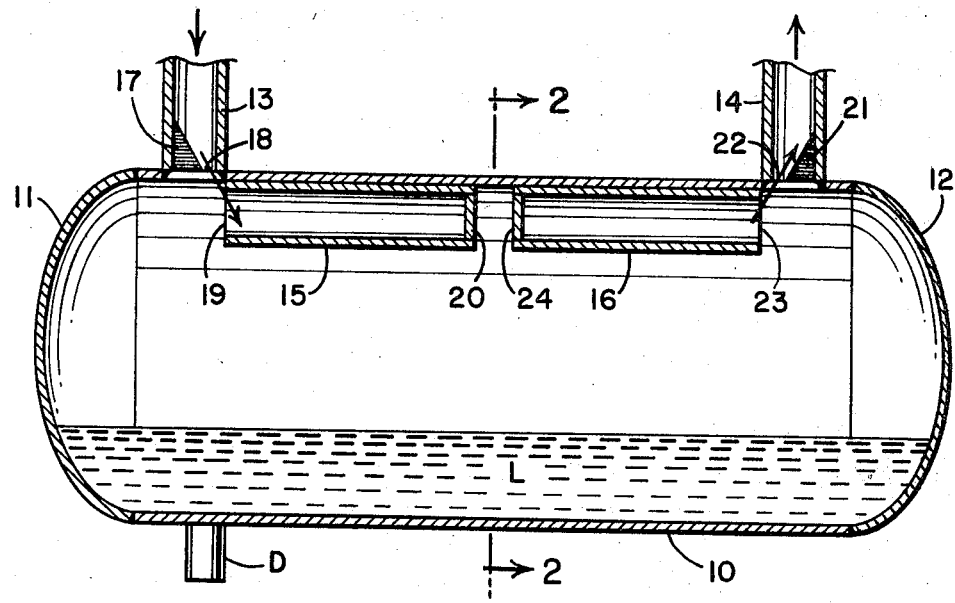
FIG. 1 is a sectional view through a horizontal vapor-liquid separator, according to one embodiment of my invention.
Figure 2:
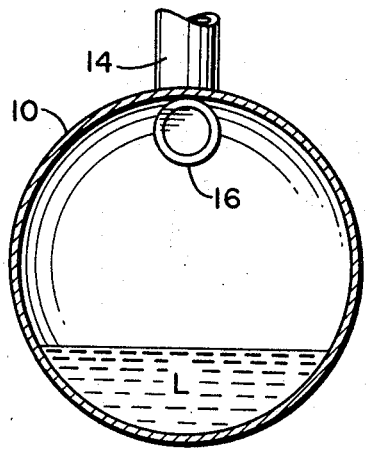
FIG. 2 is a view taken in the direction of the arrows 2—2 of FIG. 1.

Referring now to the drawings, there is shown in FIG. 1 a horizontal vapor-liquid separator according to one embodiment of the present invention including a closed vessel or drum 10. The drum 10 may be provided with a suitable manhole entrance (not shown) if it be of that size. The vessel or drum 10 may be provided with end closures 11 and 12 suitably welded, for example, to the main cylindrical body of the vessel 10.

An inlet pipe 13 communicates with the interior of the vessel 10 as does an outlet pipe 14. In the embodiment of FIG. 1, the inlet pipe and the outlet pipe 13 and 14, respectively, are positioned close to opposing ends of the vessel 10.

Disposed within the vessel 10 are organ pipes 15 and 16. The organ pipes 15 and 16 are welded or otherwise suitably rigidly secured in the positions indicated in FIG. 1.

The inlet pipe 13 is provided at its point of communication with the interior of the vessel 10 with an obstruction 17 so as to define a narrow slit or opening 18 in conjunction with the sidewalls of the vessel 10. The opening 18 is adapted for the purpose of providing a whistle construction which will cause the vapor-liquid fluid entering through the inlet pipe 13 to be directed towards an edge of the organ pipe 15 near the mouth 19 thereof. In consequence, the vapor-liquid movement towards the closed end 20 of the organ pipe 15 and reverberation back and forth therein will excite the organ pipe 15 to emit a noise having a wave length normally four times the length of the pipe 15. The particular wave length of the noise emitted, of course, may be varied by varying the length of the organ pipe 15 and taking into consideration the characteristics of the vapor-liquid fluid, the flow velocity, the droplet settling time, and the like. The fundamental frequency however will be in the infra-sonic range.

After the liquid-vapor passes into the interior of the vessel 10, the liquid particles will tend to be separated out not only because of the path of flow through the vessel 10 in accordance with conventional practice, but also because of the noise generated by the organ pipe 15. The droplets will settle down by gravity into the liquid L to be discharged as desired through a drain pipe D. As the vapor passes out through the outlet pipe 14, it will be appreciated that the organ pipe 16 will also tend to cause a degree of noise generation. Thus, it will be noted that the outlet pipe 14 is provided at its lower end with an obstruction 21 forming a narrow slit or opening 22 at the point that the pipe communicates with the inerior of the vessel 10. Thus, flow through the slit or opening 22 will be directed from an edge of the organ pipe 16 adjacent the mouth opening 23 thereof. Thus, a reverse action or suction is taking place as the vapor-liquid mixture reverberates back and forth towards the closed end 24 of the organ pipe 16.

As with the organ pipe 15, the organ pipe 16 may be varied in length to in turn generate sound of different wave lengths according to the particular design parameters required for peak separation of the liquid droplets from the vapor-liquid flow.

Figure 3:
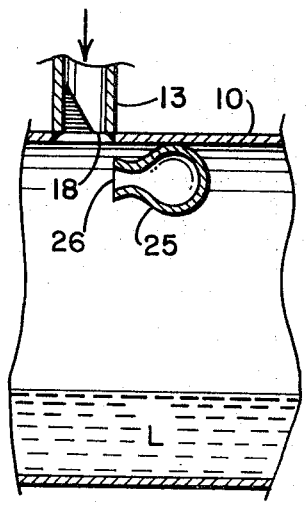
FIG. 3 is a partial sectional view through a modified form of the horizontal vapor-liquid separator of FIG. 1.

It will also be appreciated that it is not necessary to specifically employ organ pipe constructions such as 15 and 16. Instead, other types of noise generating devices may be used which achieve similar results. Thus, there is shown in FIG. 3, a modification in which a Helmholtz resonator unit 25 is suitably secured to the vessel 10 and provided with a mouth opening 26 adjacent to the whistle or slit opening 18, such that sound is generated thereby.

Figure 4:
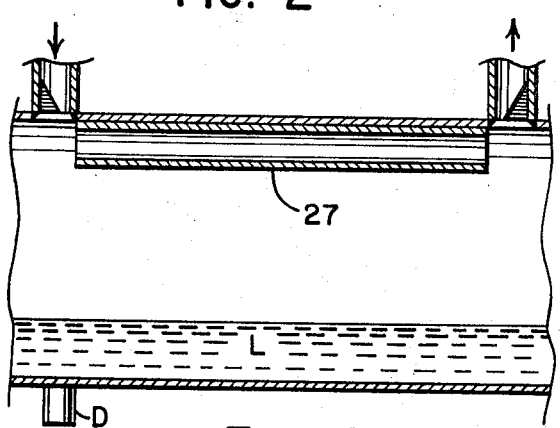
FIG. 4 is a partial sectional view through a modified form of the horizontal vapor-liquid separator of FIG. 1 showing another organ pipe construction.

Also, there is shown in FIG. 4 an organ pipe construction in which only one pipe 27 is employed which is open at both ends. In consequence, the pipe is excited by the fluid from each end at one-half the normal wave length.

Experimentation has indicated that separators embodying organ pipes having noise generating characteristics will usually result in at least 30 percent more fluid separation than has heretofore been possible with conventional constructions.

Referring now to FIG. 5, there is shown a more specific construction constituting a preferred embodiment of the invention. As in the separators previously discussed, there is provided a cylindrical vessel 28 closed at opposite ends by elliptically shaped end closures 29 and 30. Inlet lines 31 and 32 are sealably passed into the top of the vessel. In the upper half portion of the vessel there is provided a quarter wave length organ pipe 33 horizontally disposed as shown.

In the embodiment of FIG. 5, the inlet pipe 31 extending into the vessel 28 turns approximately 90° to terminate in an open end 34 facing the inner convex surface 35 of the end wall 29. This surface is provided with protuberances 36 against which incoming vapor-liquid flow impinges. The spacing between the open end 34 of the inlet pipe and the inner wall 35 of the end closure is designated $s$ in FIG. 5 and is less than one diameter $d$ of the inlet pipe. By spacing the open end of the inlet pipe in this manner from the end wall, the flow from the end of the pipe is caused to effect fairly sharp turns and in conjunction with the protuberances, the flow is better conditioned for separation of the liquid particles when traversing horizontally across the tank to ultimately pass out the outline 32.

Referring now specifically to the outlet line 32, it will be noted that this line extends into the chamber and includes a curved wall portion 37 intersecting the organ pipe 33 at an opening intermediate its ends. This opening is designated 38 and is defined in part by an inwardly extending lip 39 constituting an extension of the wall portion 37. The end of the organ pipe 33 closest to the inlet line 31 is closed as at 40. The opposite end of the pipe is open and this opening is preferably flared slightly as indicated at 41.

The organ pipe structure is completed by a sensing line 42 having one end portion extending into the outlet line 32 and turning in a direction to face flow of vapor passing through the outlet line 32 as indicated at 43. The other end of the line 42 communicates with the organ pipe at a point 44 intermediate the intersection point of the outlet line 32 with the organ pipe and the open flared end 41.

In the fragmentary plan view of FIG. 6 wherein portions of the inlet and outlet lines are shown in cross section, it will be noted that the general configuration of the organ pipe 33 itself is of a square cross section, while that of the sensing line is rectangular. The portion of the inlet line intersecting the pipe within the vessel is also a square cross section, this portion being coupled to a round cross section outlet portion exterior of the vessel at the junction of the top vessel wall.

In FIG. 6, the length of the sensing line from the portion 43 which is approximate to the lip 39 to its point 44 of communication with the pipe is designated "$a$." The vertical thickness of the sensing line 42 in turn is designated "$b$" while its width is designated "$w$" corresponding to the side dimension or width "$w$" of the square cross section of the organ pipe itself. Since all entering liquid-vapor fluid in the inlet line 31 must ultimately exit from the outlet line 32, and since the flared opening 41 of the organ pipe must receive all vapor to pass through the outlet line 32, it is preferable that the cross-sectional area of the organ pipe and outlet line equal approximately the cross-sectional area of the inlet line. Using "$d$" as the diameter of the inlet line 31, this condition requires that $$w = \frac{\sqrt{\pi}}{2} d$$

For optimum operation in the generation of infra-sonic reverberations by the organ pipe 33 and sensing line 42 combination, it is desirable that the length "$a$" of the sensing line relative to the side dimension or width "$w$" of the organ pipe bear the following relationship:

$$1 < \frac{a}{w} < 2$$

Further, the preferred relationship of the vertical or thickness dimension "$b$" to the side dimension "$w$" of the organ pipe may be expressed as follows:

$$.02 < \frac{b}{w} < .5$$

It will be evident in both FIGS. 5 and 6 that the positioning of the lip 39 at the intersection point of the outlet line 32 with the organ pipe occurs at approximately midway of the organ pipe itself. This pipe, as described previously and as shown in FIG. 5, is one quarter of the wave length of the fundamental wave form of the generated reverberations or noise.

In FIGS. 7 and 8, the square cross-sectional geometry of the organ pipe will be evident together with the structure of the lip 39. It will be noted in both figures that the lip 39 extends into the organ pipe in such a manner that a split flow in incoming fluid will result. A portion of this flow will be directed upwardly past the opening 43 of the sensing line 42 directly out of the outlet line 32. Another portion in turn will pass down the organ pipe towards the closed end 40 and ultimately return to pass out of the outlet line 32. The provision of the lip and sensing line structure assures the generation of strong infra-sonic frequencies which, as described heretofore with the other embodiments, aid materially in agglomerating liquid particles so that they fall to the bottom of the vessel.

From the foregoing, it will be apparent that the present invention has provided an improved horizontal vapor-liquid separator which may be particularly tuned or designed to meet specific requirements of liquid separation at a minimum increase in manufacturing expense and without any need for constructions that might require any maintenance. It is further apparent that the present invention provides a horizontal vapor-liquid separator which does not require any increase in the overall dimensions of conventional units and yet which provides a vastly improved construction which fully realizes the various objects set forth.

What is claimed is:

1. A horizontal vapor-liquid separator comprising: an elongated closed ended cylindrical vessel mounted with its longitudinal dimension in a horizontal plane, said vessel having a vapor-liquid inlet opening and a vapor outlet opening at the top and spaced from each other; an inlet line sealably communicating from the exterior of said vessel with said inlet opening; an outlet line sealably communicating from the exterior of said vessel with said outlet opening; a horizontal organ pipe in alignment with the direction between said inlet and outlet openings disposed within the upper half of said vessel, said pipe having an opening intermediate its ends intercepted by said outlet line, a flow diverting obstruction comprising a lip forming an extension of said outlet line into said organ pipe, said rogan pipe being closed at the one end extending towards said inlet line and open at its other end such that flow into said pipe is divided by said lip so that a portion of the flow passes over said lip through said outlet line and another portion continues towards the closed end of said organ pipe; a sensing line having one end extending into said outlet line and terminating in a turned open end facing flow diverted by said lip into said outlet line, said sensing line having its other end intercepting said organ pipe and in communication therewith at a given distance from said lip between said lip and open end of said organ pipe whereby reverberations are established by said sensing line and organ pipe, the frequency of said reverberations being in the infra-sonic range; and a liquid outlet at the bottom of said vessel for collecting liquid separated from a vapor-liquid flow into said inlet line, horizontally along said vessel interior and out said outlet line as a consequence of the horizontal travel of said vapor-liquid and said infra-sonic reverberations.

2. The subject matter of claim 1, in which said organ pipe is of square cross section and of a length equal to one quarter of the wave length of the fundamental wave defined by said reverberations, the cross section of said sensing line being rectangular of width corresponding to the side dimension of said organ pipe and of a thickness or vertical dimension divided by the side dimension of said square cross section of said organ pipe lying between .02 and .5, and in which said given distance defined by said sensing line divided by said side dimension is between 1 and 2.

3. The subject matter of claim 2 in which the cross-sectional area of said organ pipe is substantially equal to the cross-sectional area of said inlet line.

4. The subject matter of claim 1 in which said inlet line passes into said vessel and turns approximately 90° in the upper half of said vessel and terminates in an end opening facing the end wall of said vessel closest to said inlet opening, said end opening being spaced from said end wall by a distance less than one diameter of said inlet line, and in which said end wall of said vessel includes protuberances against which incoming vapor-liquid impinges.

References Cited

UNITED STATES PATENTS

| | | | |
|---|---|---|---|
| 128,566 | 7/1872 | Standing | 84—349 |
| 992,487 | 5/1911 | Ellison | 84—349 |
| 1,119,897 | 12/1914 | Tikijian | 46—179 |
| 1,687,086 | 10/1928 | Erb | 46—179 |
| 2,191,058 | 2/1940 | Jarnak | 84—349 |
| 2,369,020 | 2/1945 | Clark | 55—277 |
| 3,157,153 | 11/1964 | Moe | 55—15 |
| 3,201,338 | 8/1965 | Pennington | 55—15 |
| 3,220,166 | 11/1965 | Litsois | 55—178 |

FOREIGN PATENTS

| | | |
|---|---|---|
| 931,735 | 7/1963 | Great Britain. |
| 141,970 | 2/1962 | U.S.S.R. |
| 144,467 | 5/1962 | U.S.S.R. |

FRANK W. LUTTER, Primary Examiner

B. NOZICK, Assistant Examiner

U.S. Cl. X.R.

55—464; 116—137